United States Patent
Kakuda et al.

(10) Patent No.: US 6,767,288 B1
(45) Date of Patent: Jul. 27, 2004

(54) GAME MACHINE, STARTUP METHOD FOR THE GAME MACHINE, AND EXECUTION METHOD OF A GAME PROGRAM FOR THE GAME MACHINE

(75) Inventors: Noriyasu Kakuda, Kyoto (JP); Kousei Kazeto, Kyoto (JP); Satoru Imai, Kyoto (JP)

(73) Assignee: Kabushiki Kaisha Bandai, Tokyo (JP)

( * ) Notice: Subject to any disclaimer, the term of this patent is extended or adjusted under 35 U.S.C. 154(b) by 0 days.

(21) Appl. No.: 09/266,203

(22) Filed: Mar. 10, 1999

(30) Foreign Application Priority Data

Mar. 13, 1998 (JP) .......................................... 10-082552

(51) Int. Cl.[7] .............................................. A63F 13/00
(52) U.S. Cl. ............................................ 463/44; 43/29
(58) Field of Search .............................. 463/43, 44, 45, 463/24, 23, 29, 37, 38; 273/148 B, DIG. 28, 143 R; 700/91–93

(56) References Cited

U.S. PATENT DOCUMENTS

| | | | | |
|---|---|---|---|---|
| 4,752,068 A | * | 6/1988 | Endo .................... | 273/DIG. 28 |
| 4,799,635 A | * | 1/1989 | Nakagawa .................... | 463/44 |
| 4,858,930 A | * | 8/1989 | Sato .......................... | 273/85 G |
| 5,004,232 A | * | 4/1991 | Wong et al. .................. | 463/44 |
| 5,184,830 A | * | 2/1993 | Okada et al. | |
| 5,203,848 A | * | 4/1993 | Wang | |
| 5,395,112 A | * | 3/1995 | Darling | |
| 5,396,225 A | * | 3/1995 | Okada et al. | |
| 5,552,799 A | * | 9/1996 | Hashiguchi | |
| 5,720,663 A | | 2/1998 | Nakatani et al. | |
| 5,846,131 A | * | 12/1998 | Kitahara | |
| 5,941,775 A | * | 8/1999 | Naka et al. .................... | 463/44 |
| 5,964,661 A | * | 10/1999 | Dodge | |
| 6,071,191 A | * | 6/2000 | Takeda et al. ................. | 463/43 |

FOREIGN PATENT DOCUMENTS

| | | |
|---|---|---|
| EP | 0 431 723 A2 * | 6/1991 |
| EP | 0 769 751 | 4/1997 |
| JP | 06-266283 | 9/1994 |
| JP | 08-206357 | 8/1996 |
| JP | 08-266746 | 10/1996 |
| JP | 09-182876 | 7/1997 |
| WO | WO 93/21612 | 10/1993 |
| WO | WO 97/19736 | 6/1997 |

* cited by examiner

Primary Examiner—Michael O'Neill
(74) Attorney, Agent, or Firm—Luce, Forward, Hamilton & Scripps, LLP

(57) ABSTRACT

An improved game machine having recorded data different from other respective game machines and being able to use the recorded data on different types of game programs is provided. The game machine contains a built-in storing means for storing unrewritable information inherent in respective game machines which can be used on different types of game programs and information peculiar to respective game machines which is changed without depending on a game program which can be used on different kinds of game programs.

11 Claims, 8 Drawing Sheets

| ADDRESS | 0 | INFORMATION INHERENT IN A GAME MACHINE | 20a |
|---|---|---|---|
| | 1 | SPECIFIC INFORMATION | 20b |
| | 2 | NUMBER OF TIMES GAME MACHINE IS USED | 20c |
| | 3 | NAME PERSONAL INFORMATION | 20d |
| | 4 | BIRTHDAY PERSONAL INFORMATION | 20e |
| | 5 | SEX PERSONAL INFORMATION | 20f |
| | 6 | BLOOD TYPE PERSONAL INFORMATION | 20g |
| | 7 | NUMBER OF TIMES PERSONAL INFORMATION IS CHANGED | 20h |
| | 8 | NUMBER OF TIMES DIFFERENT TYPES OF GAMES ARE USED | 20i |
| | 9 | NUMBER OF TIMES CARTRIDGE IS USED | 20j |

*FIG. 3*

GAME MACHINE, STARTUP METHOD FOR THE GAME MACHINE, AND EXECUTION METHOD OF A GAME PROGRAM FOR THE GAME MACHINE

BACKGROUND OF THE INVENTION

1. Field of the Invention

The present invention relates to a game machine in which a player plays a game on a display screen by inserting a recording medium on which game program data is recorded.

2. Description of the Related Art

As is well known, game machines generally are used such that a game is played on a liquid crystal display screen provided on a main body of the game machine by inserting a cartridge that stores game program data. Alternatively, a game machine may play a game on a display separate from the main body by inserting a CD-ROM, floppy disk, etc., on which game program data is recorded. It is commonly known that in these game machines, when a recording medium on which the same game program data is recorded is inserted into the game machines, the same game development is realized in the game machines owned by the various respective players.

SUMMARY OF THE INVENTION

It is therefore an object of the present invention to provide a new game machine with each of the game machines having different recorded data with respect to each other. The new game machine may have different developments of a game depending on the respective game machine by storing recorded data inherent in or peculiar to the respective game machine. This will occur even if the same game program data is read into the respective game machine. The new game machine can also store recorded data on different types of game programs. The above-mentioned objects can be accomplished by the present invention as described in greater detail below.

A game machine in accordance with a first embodiment of the present invention stores information inherent to the respective game machine. The stored information can be used on different kinds of game programs and is unrewritable in a game machine for which a game is displayed on a display screen in accordance with game program data by inserting a recording medium on which the game program data is recorded.

A game machine in accordance with a second embodiment of the present invention designates information inherent in a respective game machine as a random number value that is already stored prior to shipment and/or a production number specifying the game machine for a game machine in accordance with a first embodiment of the present invention.

A game machine in accordance with a third embodiment of the present invention stores information peculiar to respective game machines, which can be used on different kinds of game programs and can be changed without depending on a game program. The game machine plays a game on a display screen in accordance with game program data by inserting a recording medium on which the game program data is recorded.

A game machine in accordance with a fourth embodiment of the present invention acquires information peculiar to respective game machines, which can be used on different kinds of game programs after power is supplied and the game machine is initialized. The game machine writes information peculiar to respective game machines that is acquired into memory and reads game program data after storing the game program data into memory. The game machine plays a game on a display screen in accordance with game program data by inserting a recording medium on which the game program data is recorded.

A game machine in accordance with a fifth embodiment of the present invention designates information peculiar to respective game machines as one or more pieces of information selected from personal information, such as a name, a birthday, a sex, or a blood type, that is inputted by a player. Additionally, information is designated based on the number of times a game machine is used (which is incremented by supplying power), information based on the number of times a recording medium is used (which is incremented by inserting the recording medium), and information based on the number of times different types of games are used (which is incremented by inserting a recording medium on which different game program data from the one recorded on a recording medium inserted the last time is recorded), for a game machine in accordance with a third or a fourth embodiment of the present invention.

A game machine in accordance with a sixth embodiment of the present invention stores information based on the number of times a game machine is used. This can be used on different kinds of game programs and is incremented by cycling power. The game machine changes the information based on the number of times power is cycled for the game machine. The game machine plays a game on a display screen in accordance with game program data by inserting a recording medium on which the game program data is recorded.

A game machine in accordance with a seventh embodiment of the present invention stores information based on the number of times different kinds of games are used. This is incremented by inserting a recording medium on which game program data is recorded that is different from the one recorded on a recording medium inserted in a game machine the last time. This information can be used on the different kinds of games with the game machine changing the information based on the number of times different kinds of games are used by inserting the recording medium on which the different game program data is recorded. The game machine plays a game on a display screen in accordance with game program data by inserting a recording medium on which the game program data is recorded.

A game machine in accordance with an eighth embodiment of the present invention stores specific information specifying the kind of game program data recorded on a recording medium inserted in a game machine. The game machine determines whether or not a recording medium is inserted after power is supplied and the game machine is initialized and, if it is inserted, reads the specific information from the recording medium and compares the specific information of the recording medium and the specific information stored. The machine writes the specific information of the recording medium into memory if the specific information stored and the specific information of the recording medium are different. The game machine plays a game on a display screen in accordance with game program data by inserting a recording medium on which the game program data is recorded.

A startup method of a game machine in accordance with a ninth embodiment of the present invention acquires information peculiar to respective game machines that can be used on different kinds of game programs after power is supplied and a game machine is initialized. The acquired information peculiar to respective game machines is stored and then the game program data is read. The startup method is provided for a game machine in which a game is played on a display screen in accordance with game program data by inserting a recording medium on which the game program data is recorded.

A startup method of a game machine in accordance with a tenth embodiment of the present invention designates information peculiar to respective game machines as one or more pieces of information selected from personal information such as a name, a birthday, a sex, or a blood type, or information based on the number of times a game machine is used (which is incremented by supplying power), information based on the number of times a recording medium is used (which is incremented by inserting the recording medium), and information based on the number of times different types of games are used (which is incremented by inserting a recording medium that is different from the recording medium inserted the last time, and upon which different game program data is recorded).

A startup method of a game machine in accordance with an eleventh embodiment of the present invention determines whether or not a recording medium is inserted after power is supplied and a game machine is initialized. If it is inserted, the game machine reads the specific information specifying the kind of game program data recorded on the recording medium to compare with the specific information stored in the game machine and to store the specific information from the recording medium into memory if the specific information are different. The startup method is provided for a game machine in which a game is played on a display screen in accordance with game program data by inserting a recording medium on which the game program data is recorded.

An execution method of a game program for a game machine in accordance with a twelfth embodiment of the present invention plays a game on a display screen in accordance with game program data by inserting a recording medium on which the game program data is recorded. The execution method is used for a game machine that is provided with an uninitialized memory, for storing information peculiar to respective game machines, that is changed without depending on the game program. The method is devised so that when the information peculiar to respective game machines is acquired and stored in memory after power is supplied and the game machine is initialized, then the information peculiar to respective game machines is retrieved from the memory to be used on game program data recorded in a recording medium inserted in the game machine.

An execution method in accordance with a thirteenth embodiment of the present invention designates information peculiar to respective game machines as one or more pieces of information selected from personal information such as a name, a birthday, a sex, or a blood type, that is inputted by a player. Information is also designated based on the number of times a game machine is used (which is incremented by supplying power), information based on the number of times a recording medium is used (which is changed by inserting the recording medium), and information based on the number of times different types of games are used (which is incremented by inserting a recording medium that is different from the recording medium inserted the last time, and upon which different game program data is recorded).

BRIEF DESCRIPTION OF THE DRAWINGS

Still further aspects, features, and advantages of the invention will be apparent from the detailed description and claims when read in conjunction with the accompanying drawings.

FIG. 3 is a table describing a memory area of the information storing portion shown in FIG. 2;

DESCRIPTION OF THE PREFERRED EMBODIMENTS

Figure 1:
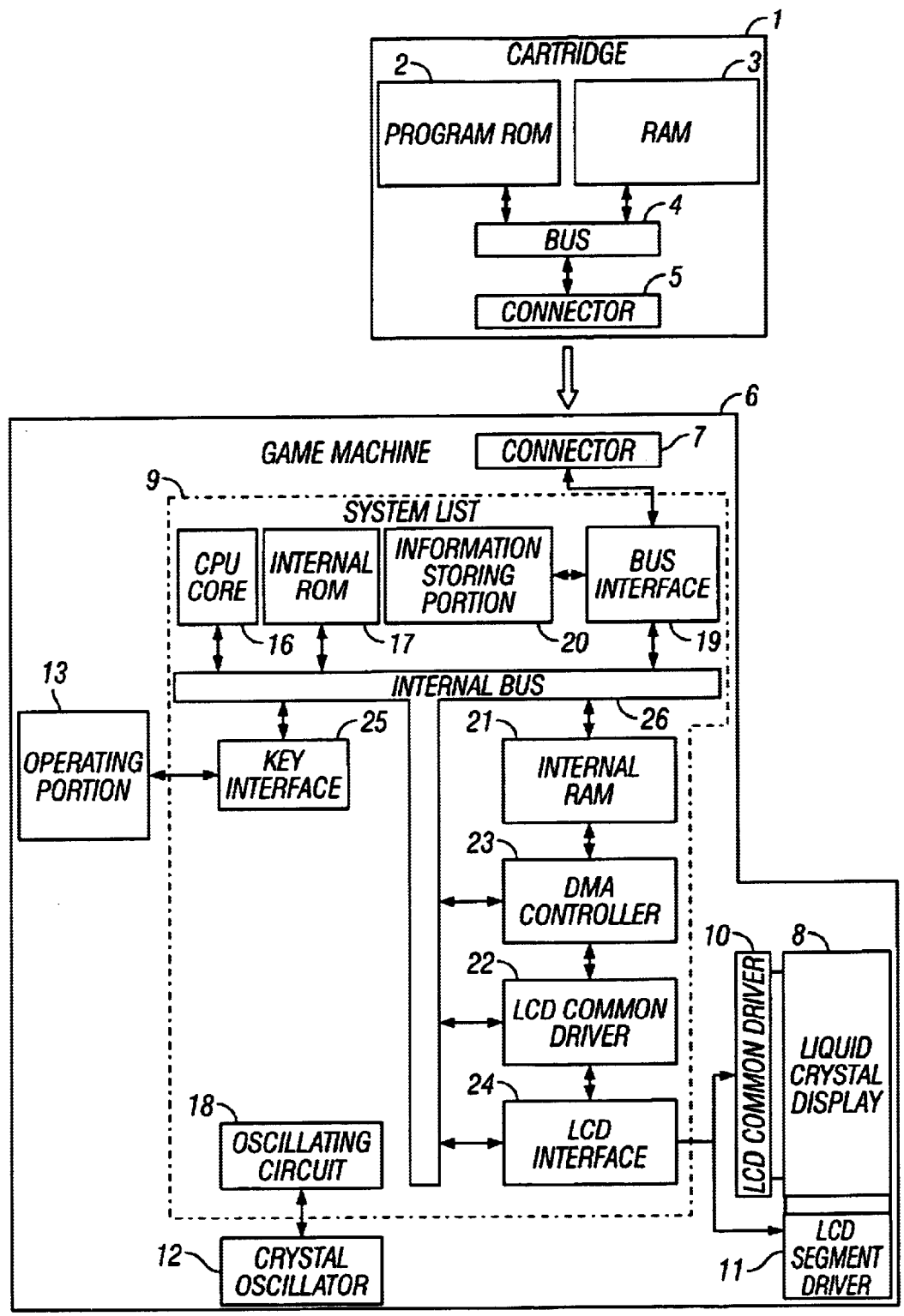
FIG. 1 is a block diagram of a portable game machine and a cartridge in accordance with an embodiment of the present invention.

A game machine in accordance with a first embodiment of the present invention relates to a portable game machine in which a game is displayed on a liquid crystal display screen provided on a main body by inserting a cartridge (a recording medium) that stores game program data. FIG. 1 is a block diagram of a portable game machine and a cartridge in accordance with an embodiment of the present invention. Implemented on a substrate of a cartridge 1 is a program ready-only memory (ROM) 2 (storage element) that stores game program data and specific information that includes a manufacturer code and a title code specifying the kind of game program data. A random access memory (RAM) 3 temporarily stores data inside the program ROM 2 for processing and for temporarily storing data necessary for playing a game that is being generated during the execution of a game program (such as item data and stage clearing data) and for storing converted data. A connector 5, on a side of the cartridge, is connected to the program. ROM 2 and the RAM 3 via a bus 4.

Figure 2:
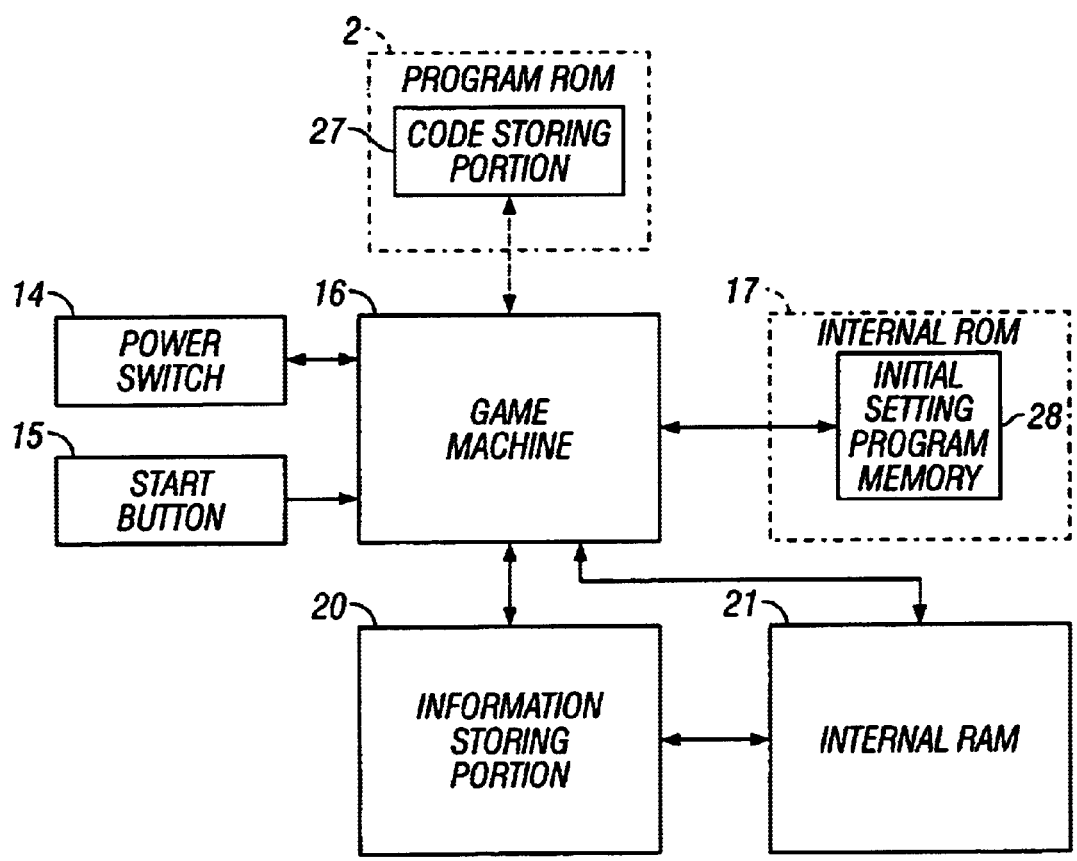
FIG. 2 is a block diagram illustrating a control method in the game machine shown in FIG. 1.

Implemented on a substrate of a game machine 6 is a system large scale integrated circuit (LSI) 9. A connector 7, on a side of the game machine 6, connects to the connector 5 of the cartridge 1. The system LSI 9 initializes the game machine by supplying power and controls progress of a game by reading game program data from the program ROM 2 of the cartridge 1 based on an input signal by the operation of a player. The system LSI 9 also controls the display of images on a liquid crystal display (LCD) 8. The LCD 8 is connected to the system LSI 9 via a LCD common driver 10 and a LCD segment driver 11. A crystal oscillator 12 generates a clock signal for synchronizing with the system LSI 9 and an operating portion 13 on which keys, that are to be operated by a player, are arranged. In addition, as shown in FIG. 2, a power switch 14 and a start button 15 are arranged on the operating portion 13. A speaker, a button for adjusting the sound volume, a luminance volume adjustment, as well as their peripheral devices, and a power source are not shown, but would generally comprise part of the game machine 6.

The system LSI 9 comprises a central processing unit (CPU) core 16 for initializing a register, a RAM, and a system area by turning on the power switch 14 of the game machine 6 and then executing an initial setting program (described below). The program acquires and processes information peculiar to respective game machines and a display of a logo mark, reads game program data from the program ROM 2 of the cartridge 1 based on various kinds of input signals from the operating portion 13, and executes the game program and outputs the results to each device. An internal ROM 17 stores the initial setting program that is executed by supplying power, an oscillating circuit 18 outputs a clock signal based on a pulse signal generated by the crystal oscillator 12, and a bus interface 19 inputs and outputs data between the system LSI 9 and the cartridge 1. An information storing portion 20, connected to the bus interface 19, stores unrewritable information peculiar to respective game machines and information peculiar to a game machine that is acquired by executing the initial setting program. An internal RAM 21 temporarily stores information data for the information storing portion 20 and also various kinds of data such as display data and sound data. A direct memory access (DMA) controller 23, connected to the internal RAM 21, manages a data area of the internal RAM 21 as well as transmits various kinds of data, such as display data and sound data, stored in the internal RAM 21 to a display controller 22 or a sound controller (not shown) without the control of the CPU core 16. The display controller 22, connected to the DMA controller 23, processes data such as coordinates, fonts, and screens that is transmitted from the internal RAM 21 into display data. A LCD interface 24, connected to the display controller 22 and situated between the LCD common driver 10 for the LCD 8 and the LCD segment driver 11, converts the display data into data that can be displayed on the LCD 8. A key interface 25, connected to the operating portion 13 and an internal bus 26, connects the CPU core 16, the internal ROM 17, the bus interface 19, the internal RAM 21, the DMA controller 23, the display controller 22, the LCD interface 24, and the key interface 25.

In FIG. 2, a code storing portion 27, inside the program ROM 2, stores specific information consisting of a manufacturer code and a title code that specifies the kind of game program data. An initial setting program memory 28, inside the internal ROM 17, stores an initial setting program that is executed by turning on the power switch 14.

The CPU core 16 records the number of times a game machine is used (which is incremented by supplying power to the game machine 6), the number of times a cartridge is used (which is incremented by inserting the cartridge 1), and the number of times different kinds of games are used (which is incremented by inserting the cartridge 1 in which is different game program data than from the game program data recorded in the cartridge 1 inserted the last time). The CPU core 16 compares the specific information stored in the code storing portion 27 and the specific information stored in the information storing portion 20.

As shown in FIG. 3, the information storing portion 20 comprises an inherent information memory 20a of address 0 for storing information inherent in respective game machines (for example a random number value acquired by generating a random number), a specific information memory 20b of address 1 for storing specific information specifying the kind of game program data, an information memory 20c of address 2 for storing the number of times a game machine is used, a name information memory 20d of address 3, a birthday information memory 20e of address 4, a sex information memory 20f of address 5, and a blood type information memory 20g of address 6. Thus, addresses 3–6 stores personal information regarding a name, a birthday, a sex type, and a blood type, respectively. An information memory 20h of address 7 stores the number of times the personal information is changed, an information memory 20i of address 8 stores the number of times different kinds of games are used, and an information memory 20j of address 9 stores the number of times a cartridge is used. In addition, the internal RAM 21 is provided with a work area for storing each piece of the information data written from the information storing portion 20.

Figure 4:
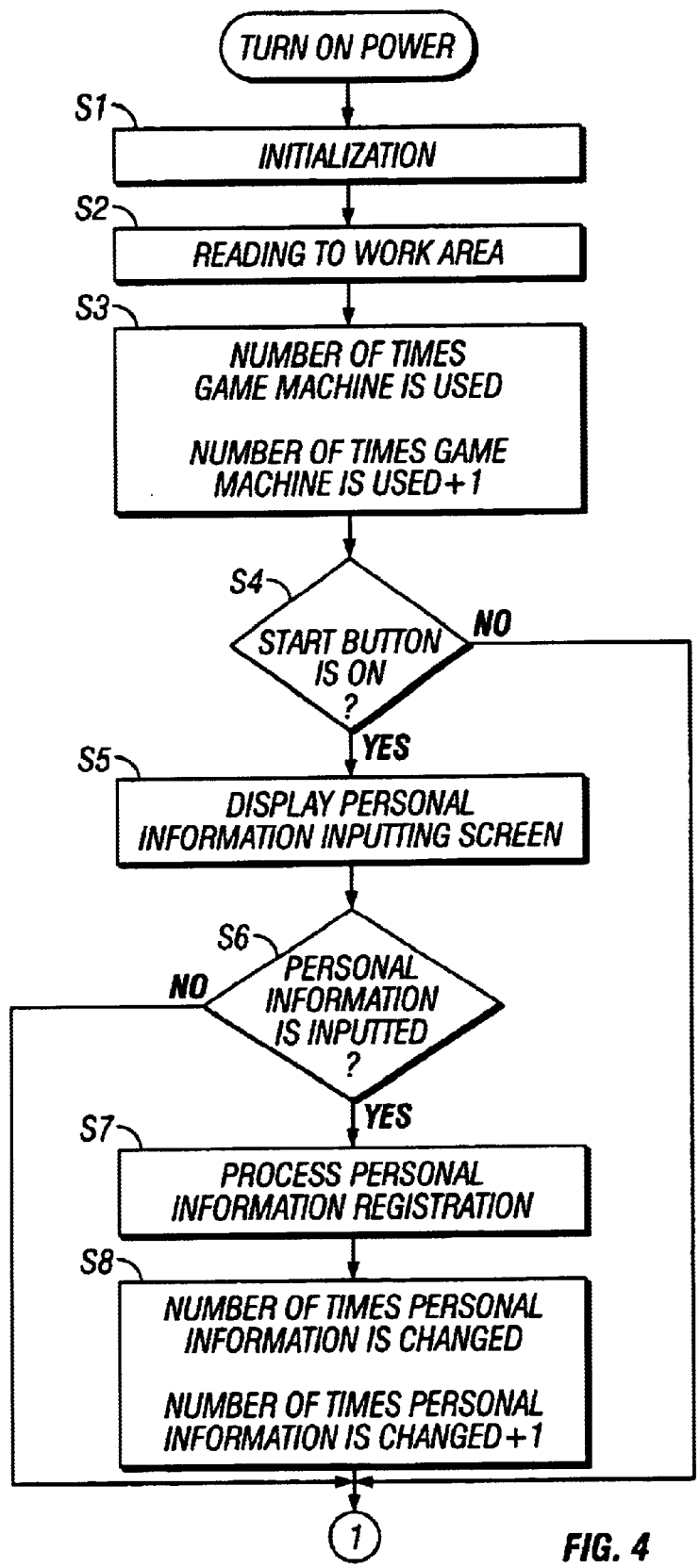
FIG. 4 is a flow chart describing an example of an initial setting program in accordance with an embodiment of the present invention.

With reference to FIG. 4, an initial setting program is now described in greater detail. When the power switch 14 of the game machine 6 is turned on to supply power, the initial setting program that is stored in the initial setting program memory 28 of the internal ROM 17, is executed by the CPU core 16. A register, excluding the internal ROM 17 and the information storing portion 20, a RAM, and a system area are first initialized (step S1). Next, information inherent in respective game machines, as shown in FIG. 3 of the information storing portion 20, and each piece of information peculiar to respective game machines, are written in a work area in the internal RAM 21 (step S2). The information memory 20c, for identifying the number of times a game machine is used, is stored in the work area, and thereafter the CPU core 16 adds "1" to the number of times a game machine is used and then it is written in the work area to update the value (step S3) (i.e., the work area is updated to reflect the number of times the game is used).

Whether or not a player has pressed the start button 15 of the operating portion 13 is determined (step S4) and, if the start button 15 has been pressed, personal information data in the name information memory 20d, the birthday information memory 20e, the sex information memory 20f, and the blood type information memory 20g that are stored in the work area are sent to the display controller 22 under the control of the DMA controller 23. The data are then sent to the LCD 8 via the LCD interface 24 under the control of the CPU core 16, and through the LCD common driver 10 and the LCD segment driver 11, after being converted to dot display data in the display controller 22, to display each piece of the personal information (step S5). Whether or not the player has inputted personal information is then determined (step S6) and, if the personal information has been inputted, the inputted personal information is written in the work area in order to execute personal information registration processing to update personal information in the work area (step S7). The number of times personal information is changed, in the information memory 20h, is stored in the work area and the CPU core 16 adds "1" to the number of times personal information is changed and the work area is updated to reflect the number of times personal information is changed in the work area (step S8).

Figure 5:
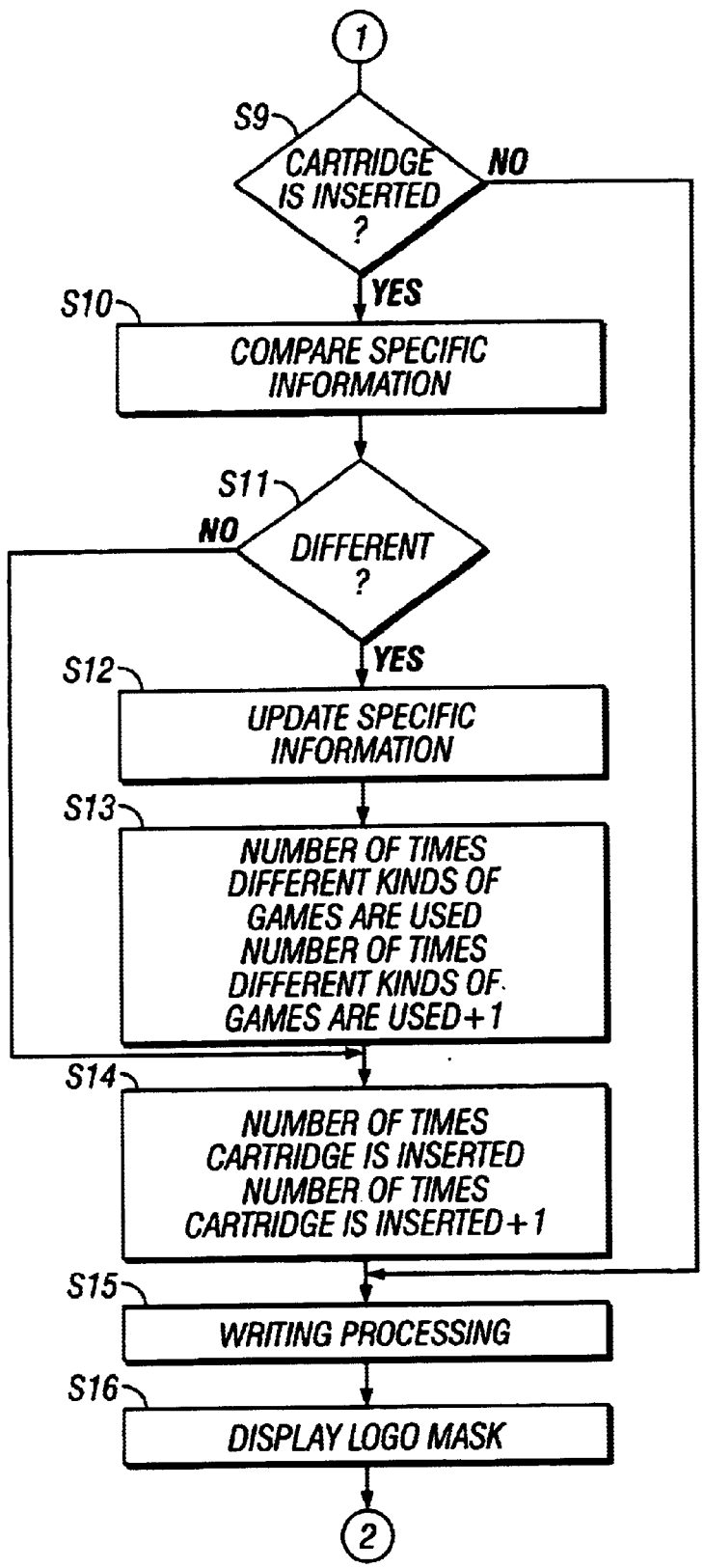
FIG. 5 is a flow chart describing an example of an initial setting program in accordance with an embodiment of the present invention.

If the start button 15 has not been pressed in step S4, or if personal information has not been inputted in step S6, or after the processing of step S8, it is determined (step S9) whether the cartridge 1 is inserted in the game machine 6, as shown in FIG. 4. With reference to FIG. 5, if the cartridge 1 is inserted, the CPU core 16 compares the specific information for specifying the kind of game program data that is stored in the code storing portion 27 inside the program ROM 2 with the specific information in the specific information memory 20b that is stored in the work area (step S10). If they are different (step S11), the specific information in the code storing portion 27, which is inside the CPU core 16, is written in the work area to update the specific information in the work area (step S12). Consequently, the number of times different kinds of games are used in the information memory 20i, is stored in the work area and, if the comparison (step 11) results in finding the games are different, the CPU core 16 adds "1" to the number of times different kinds of games are used and the work area is updated to reflect the number of times different kinds of games are used (step S13). When the specific information in the code storing portion 27 in step S11, and after the processing of step 13, the specific information in the work area are the same, the number of times a cartridge is used in the information memory 20i is stored in the work area. The CPU core 16 adds "1" to the number of times a cartridge is used and then it is written in the work area in order to update the number of times a cartridge is used (step S14).

When the cartridge 1 is not inserted in the game machine 6 (step S9), and also after the processing of step S14, a writing processing (step S15) is executed so that the specific information in the work area, the number of times a game machine is used, the personal information of a name, a birthday, a sex and a blood type, the number of times personal information is changed, the number of times different kinds of games are used, and the number of times a cartridge is used are written and stored in the specific information memory 20b of address 1, the information memory 20c of address 2, the name information memory 20d of address 3, the birthday information memory 20e of address 4, the sex information memory 20f of address 5, the blood type information memory 20g of address 6, the information memory 20h of address 7, the information memory 20i of address 8 and the information memory 20j of address 9, respectively. Logo mark data that is stored in the internal ROM 17 is thereafter converted to dot display data in the display controller 22 to display the logo mark in the LCD 8 (step S16).

Figure 6:
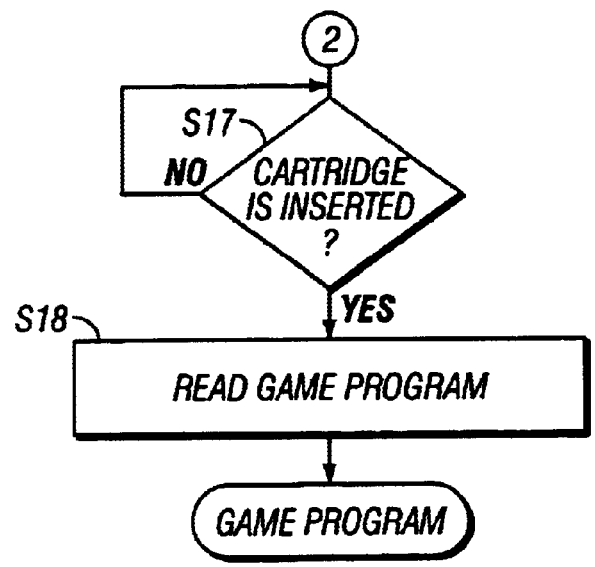
FIG. 6 is a flow chart describing an example of an initial setting program in accordance with an embodiment of the present invention.

As shown in FIG. 6, when the cartridge 1 is inserted in the game machine 6 (step S17), game program data in the program ROM 2 of the cartridge 1 is read via the bus interface 19 under the control of the CPU core 16 (step S18). Furthermore, when the cartridge 1 is replaced while power is on, the initial setting program may be set to start from re-initialization and step S9 through step S18 of the initial setting program may be set to be executed by an interruption processing.

An execution method of a game program is now described in greater detail. If a game program has an instruction to display the title of a game in the LCD 8, display data is read from the program ROM 2 and temporarily stored in the internal RAM 21. The display data stored in the internal RAM 21 is sent to the display controller 22 under the control of the DMA controller 23 and is then converted into dot display data in the display controller 22. The dot display data is sent to the LCD 8 via the LCD interface 24 under the control of the CPU core 16, and through the LCD common driver 10 and the LCD segment driver 11, to display the game title in the LCD 8.

Figure 7:
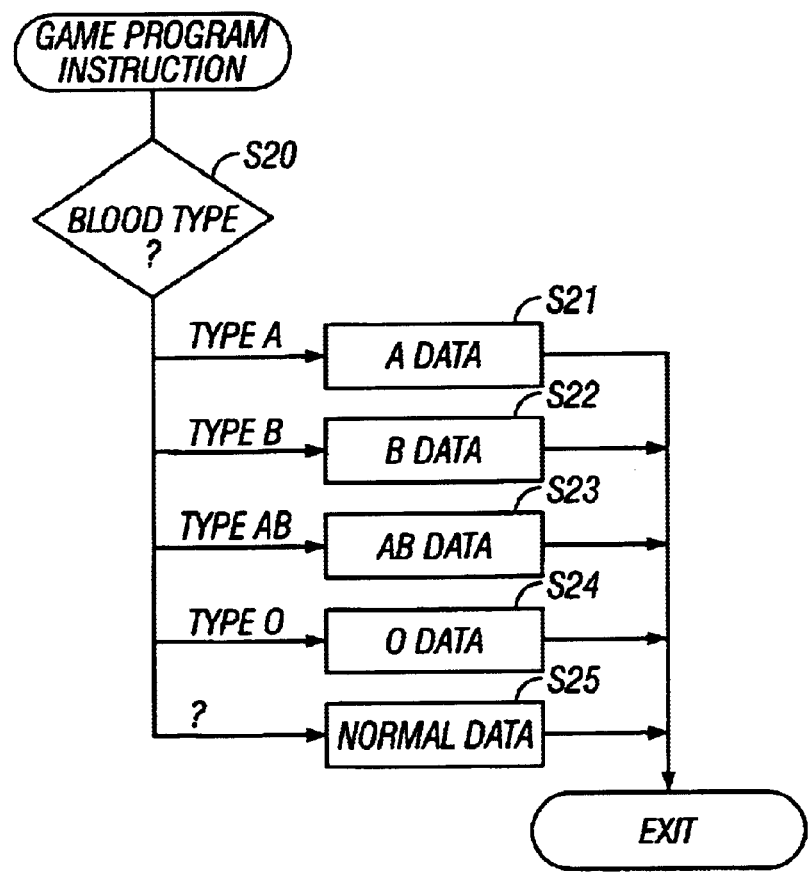
FIG. 7 is a flow chart describing an example of an execution program for a game program for a game machine in accordance with an embodiment of the present invention.

If a game program has an instruction to use the blood type personal information stored in the blood type information memory 20g of the information storing portion 20, a game program instruction, as shown in FIG. 7 as an example, is executed. That is, the blood type personal information stored in the work area of the internal RAM 21 such as type A, type B, type AB, type O, or unregistered, is determined (step S20). If it is type A, the status of a character in the game program data is changed such that the initial value of methodicalness is a value larger than that of other blood type data and the character is made methodical and, for example, dressed orderly (step S21). If it is type B, the status of a character of the game program data is changed such that the initial value of creativity is a value larger than that of other blood type data and the character is made creative and, for example, dressed individualistically (step S22). If it is type AB, the status of a character of the game program data is changed such that the initial value of talent is a value larger than that of other blood type data and the character is made to have a variety of talents and, for example, changed to be dressed in accordance with time series (step S23). If it is type O, the status of a character of the game program data is changed such that the initial value of largeheartedness is a value larger than that of other blood type data and the character is made largehearted and, for example, dressed casually (step S24). If the blood type is not registered, the status of a character of the game program data is not changed and remains as the initial value (normal data) and the character is made an ordinary person dressed ordinarily (step S25). Furthermore, a behavior pattern of a character may be set to depend upon each status.

In accordance with an embodiment of the present invention of using information inherent in respective game machines and information peculiar to respective game machines on different kinds of game programs is now described. It is needless to say that an embodiment described below is only an example and the present invention is not limited to the embodiment.

If an instruction is executed for using information inherent in respective game machines (a random number value) stored in the inherent information memory 20a of the information storing portion 20 on a game program, a random number value is read in the work area from the inherent information memory 20a and the read random number value is determined. In a gambling scene (casino and slot machine) for a game in progress, for example, if the result of gambling coincides with the random number value, then money items, physical strength items, or military power items are increased.

If an instruction is executed for using the number of times a game machine is used that is stored in the information memory 20c of the information storing portion 20 on a game program, the number of times a game machine is used is read in the work area from the information memory 20c and, for example, the number of times it is used is determined and, if it exceeds a certain value, dressing of a character is changed. If an instruction is executed for using name personal information stored in the name information memory 20d of the information storing portion 20 of the game program, for example, processing is carried out for replacing the name of a character of the game program data with the name stored in the name information memory 20d.

If an instruction is executed for using birthday personal information stored in the birthday information memory 20e or sex personal information stored in the sex information memory 20f of the information storing portion 20 on a game program, the birthday personal information or the sex personal information is read in the work area in the same manner as discussed above. For example, if the read birthday coincides with the data in the game, the processing jumps to a scene for celebrating the birthday and birthday events are executed by displaying a message such as "Happy Birthday" and the sex of a main character in the game is changed to the sex.

If an instruction is executed for using the number of times different kinds of games are used (as stored in the information 20i of the information storing portion 20) on the game program, the number of times different kinds of games are used is read in the work area from the information memory 20i. If, for example, it is determined that the read value exceeds a certain value, then the status is changed to "a mini game cannot be played" if the value is 0 to 10, to "one mini game can be played" if it is 11 to 100, to "two mini games can be played" if it is 101 to 200, and to "all the mini games can be played" if it is 201 to 255, and so on. If an instruction is executed for using the number of times a cartridge is used (as stored in the information memory 20j of the information storing portion 20) on a game program, the number of times a cartridge is used is read in the work area. For example, if the read value exceeds a certain value then a hidden path is made to emerge.

In a game machine 6 in accordance with an embodiment of the present invention, the inherent information memory 20a, the specific information memory 20b, the information memory 20c, the name information memory 20d, the birthday information memory 20e, the sex information memory 20f, the blood type information memory 20g, the information memory 20h, the information memory 20i and the information memory 20j are storing information peculiar to respective game machines that are changed without depending on a game program. The data are written in the work area of the internal RAM 21 and changed in the CPU core 16 by the initial setting program to be written in each information memory of the information storing portion 20, and the game program is thereafter executed. Furthermore, in the game machine 6 in accordance with an embodiment of the present invention, information peculiar to the respective game machines is acquired, which can be used on different kinds of game programs after power is supplied to the game machine 6 and the game machine is initialized at step S2 through step S14 of the initial setting program. The acquired information peculiar to respective game machines is stored in each information memory of the information storing portion 20 at step S15. Game program data is read from the cartridge 1 inserted in the game machine 6 at step S18 after the above mentioned initial setting program is executed.

Moreover, in the game machine 6 in accordance with an embodiment of the present invention, it is determined whether the cartridge 1 is inserted and, if it is inserted, the specific information is read from the cartridge 1. The specific information of the cartridge 1 and the specific information stored in the specific information memory 20b are compared at steps S9 and S10 of the initial setting program. If the information read from cartridge 1 and the specific information memory 20b are different, the specific information of the cartridge 1 is stored in the specific information memory 20b at step S15.

In a startup method of the game machine in accordance with an embodiment of the present invention, after the game machine is initialized at step Si of the initial setting program, information peculiar to respective game machines is acquired at step S2 through step S14. The game program data is read from the cartridge 1 at step S18 after storing information peculiar to respective game machines that is acquired at step S15 in each information memory.

In an execution method of a game program for the game machine in accordance with an embodiment of the present invention, for example, information peculiar to respective game machines (i.e., information from the particular game machine upon which the game program is being executed) is fetched from each information memory in the game machine and used on a game program in the inserted cartridge 1 by game program instructions of step S20 through S25.

In accordance with an embodiment of the present invention, because a built-in storing means is provided for storing unrewritable information inherent in respective game machines which can be used on different kinds of game programs, a same game program can have different game developments in different game machines. Additionally, because a built-in storing means is provided for storing information peculiar to respective game machines which is changed without depending on the game program data that can be reflected on different kinds of game programs, a same game can have different game developments in different game machines. In addition, a game having game developments different from the last time it was played can be enjoyed when the same game is played with the same game machine. Because information peculiar to respective game machines is changed by using a game machine, a player has an impression that the game machine was making an advance or adapting and, thus, a player can enjoy more variations when playing a game.

In accordance with an embodiment of the present invention, because game program data is read after information peculiar to respective game machines is acquired and stored in the storing means, the same effect as mentioned above can be obtained. Additionally, because a game program instruction reflecting information peculiar to respective game machines on the game program is set to be executed, the same effect as mentioned above can be obtained.

Furthermore, in accordance with an embodiment of the present invention, although a recording medium in which the game program data is recorded is explained with a cartridge that stores game program data, as an example, the cartridge may be a recording medium in which the game program data is recorded by storing the game program data into a storage element. The recording medium may also be an optical disk such as a CD-ROM, a CD-R, a MD, a magnet-optical disk such as a MO and a DVD, a floppy disk, or a semiconductor memory such as a memory card, as known in the art.

Figure 8:
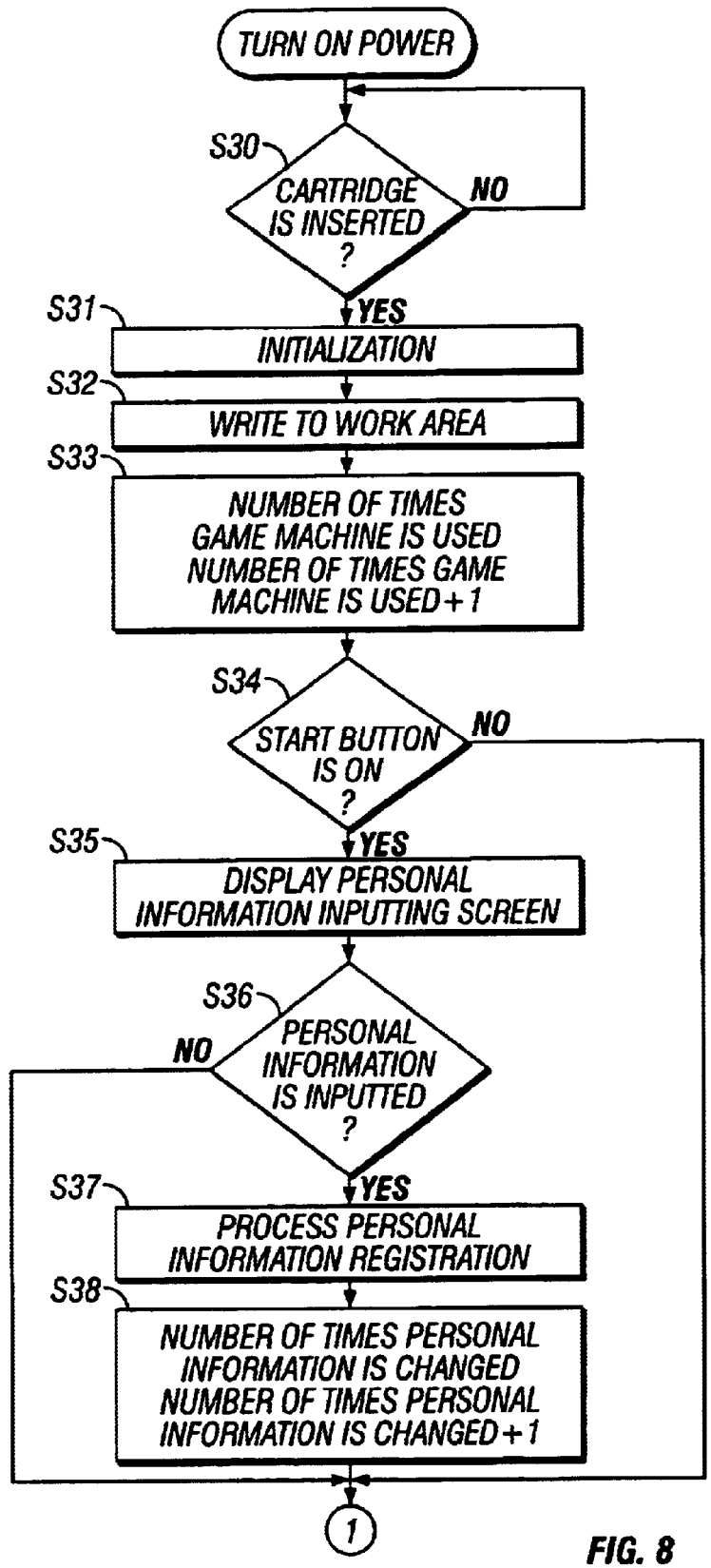
FIG. 8 is a flow chart describing an example of an initial setting program in accordance with an embodiment of the present invention.
Figure 9:
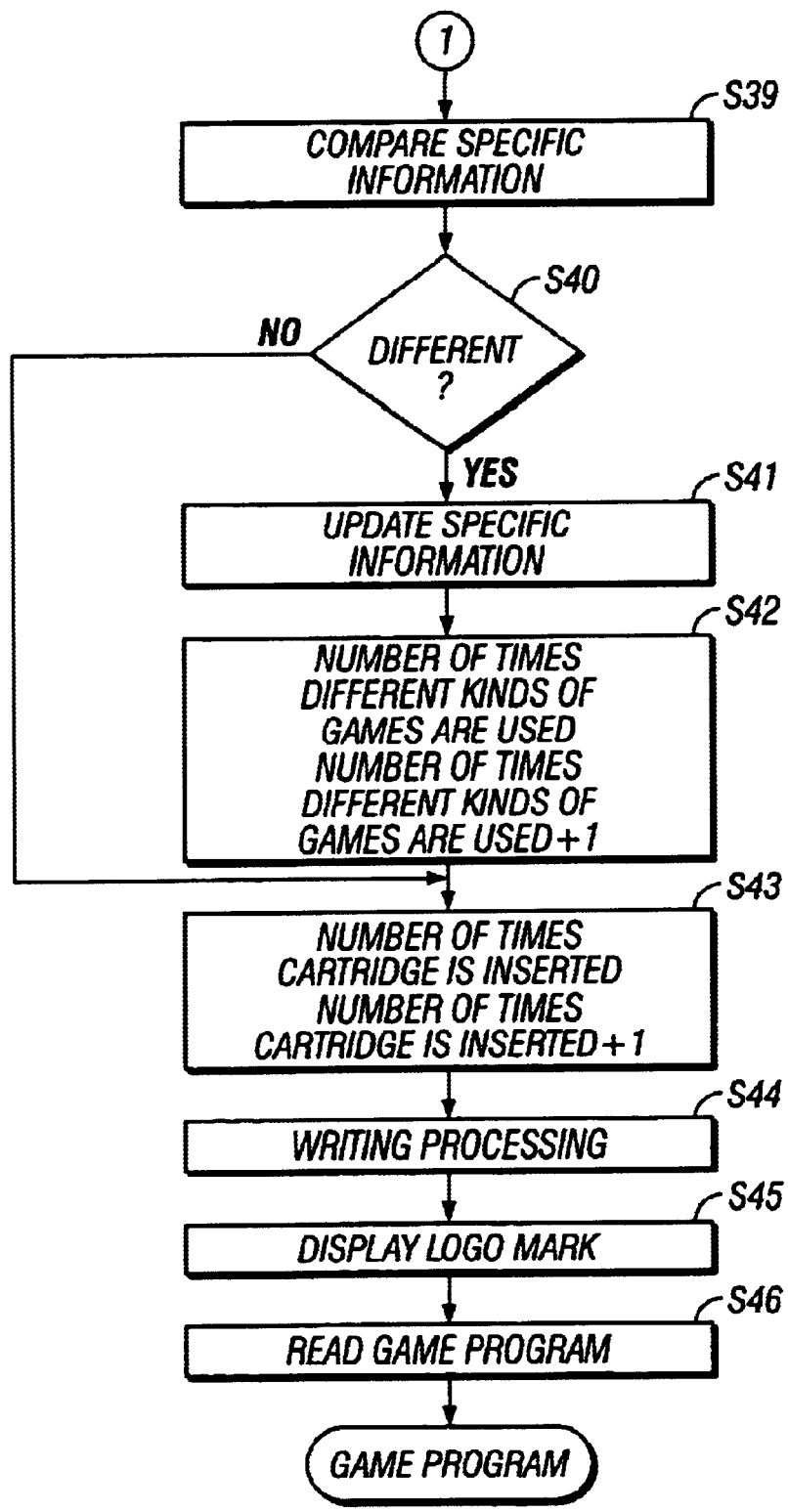
FIG. 9 is a flow chart describing an example of an initial setting program in accordance with an embodiment of the present invention.

An alternative embodiment of the present invention relates to a game machine for executing an initial setting program provided that power is supplied to the game machine, as shown in FIG. 1 through FIG. 3, and that a recording medium on which the game program data is recorded is inserted in the game machine. FIG. 8 and FIG. 9 are flow charts describing an example of an initial setting program. An initial setting program is described below with reference to FIG. 1 through FIG. 6.

When a power switch 14 of a game machine 6 is turned on and power is supplied to the game machine, whether a cartridge 1 is inserted in the game machine 6 is determined (step S30). If the cartridge 1 is inserted, step S1 through step S8 in the first embodiment are executed (step S31 through step S38), then specific information for specifying the kind of game program data stored in a code storing portion 27 inside a program ROM 2 and specific information of a specific information memory 20b stored in a work area are compared in a CPU core 16 (step S39). Step S11 through step S14 in the first embodiment is subsequently executed (step S40 through step S43), and then a writing processing (step S44) is executed so that the specific information in the work area, the number of times a game machine is used, the personal information of a name, a birthday, a sex and a blood type, the number of times personal information is changed, the number of times different kinds of games are used, and the number of times a cartridge is used, are written and stored in the specific information memory 20b of address 1, the information memory 20c of address 2, the name information memory 20d of address 3, the birthday information memory 20e of address 4, the sex information memory 20f of address 5, the blood type information memory 20g of address 6, the information memory 20h of address 7, the information memory 20i of address 8, and the information 20j of address 9, respectively. Logo mark data stored in the internal ROM 17 is thereafter converted into dot display data in the display controller 22 to display the logo mark in a LCD 8 (step S45) and game program data in a program ROM 2 of the cartridge 1 is read via a bus interface 19 under the control of the CPU core 16 (step S46).

The initial setting program may be set such that step 39 is executed after step S33, then step S40 through step S43, thereafter step S34 through S38, and subsequently step S44 through step S46. Thus, similar effects as in the first embodiment can be attained as well.

The display screen of the game machine may be provided in the main body or may be provided separately. Although a work area for each piece of information is provided inside the internal RAM 21, it is needless to say that each piece of information may be read in the operating means from the storing means directly by accessing the storing means and writing in the storing means after executing the operating processing that includes the comparing processing. The storing means may be, for example, an uninitialized memory implemented separately (an EEPROM, a flush memory, an SRAM with a backup power source, etc., as known in the art) other than an uninitialized memory built in a system LSI.

Information inherent in respective game machines is the only information respective game machines originally have and, for example, information inherent in respective game machines may be a random number value acquired by generating a random number at the time of shipment from a factory, a manufacture number specifying a game machine, and so on. Random number information acquired by generating a random value each time power is supplied or information which a player acquires during his/her daily life such as residential area information, or marital status information may be used as information peculiar to respective game machines.

Information based on the number of times a game machine is used, information based on the number of times a recording medium is used, and information based on the number of times different kinds of games are used may be, other than numeral information that shows the number of times added by using a game machine or by inserting a storing medium. Numeral information may be acquired by assigning the number of times in a variable of an expression.

As described above, in accordance with an embodiment of the present invention, a same game program can have different game developments in different game machines. In addition, a game having game developments different from the last time can be enjoyed even when the same game is played with the same game machine and, because information peculiar to respective game machines is changed by using a game machine, an improved game machine is provided.

Because information peculiar to respective game machines can be used on different kinds of game programs, game programs with new concepts that can use the information may be developed. Due to these reasons, the industrial applicability of the present invention is very high.

Various embodiments of the preset invention have now been described in detail. Because it is obvious to those having ordinary skill in the art that many additional changes and modifications can be made in the above-described details without departing from the nature and spirit of the present invention, it is understood that the present invention is not to be limited to said details except as set forth in the appended claims.

What is claimed is:

1. A game machine comprising:

a display screen on which graphical components of a game program can be displayed in accordance with game program data, the game program data provided by a recording medium inserted into a receiving port on the game machine; and storage circuit having stored therein information corresponding to the game machine and usable in affecting the play of the game program;

wherein the information stored in the storage circuit is based on the number of different types of games that have been played on the game machine.

2. A game machine comprising:

a display screen on which graphical components of a game program can be displayed in accordance with game program data, the game program data provided by a recording medium inserted into a receiving port on the game machine; and storage circuit having stored therein information corresponding to the game machine and usable in affecting the play of the game program;

wherein said information corresponding to the game machine includes a random number value pre-programmed in the game machine by a manufacturer of the game machine.

3. A game machine comprising:

a display screen on which graphical components of a game program can be displayed in accordance with game program data, the game program data provided by a recording medium inserted into a receiving port on the game machine; and storage circuit having stored therein information corresponding to the game machine and usable in affecting the play of the game program;

wherein said information corresponding to the game machine is a production identifier specifying the particular game machine.

4. A game machine comprising:

a display screen on which graphical components of a game program can be displayed in accordance with game program data, the game program data provided by a recording medium inserted into a receiving port on the game machine; and storage circuit having stored therein information identifying the game machine and usable in affecting the play of the game program;

wherein said information identifying the game machine is a production identifier specifying the particular game machine.

5. A game machine comprising:

a display screen on which graphical components of a game program can be displayed in accordance with game program data, the game program data provided by a recording medium inserted into a receiving port on the game machine; and storage circuit having stored therein information identifying the game machine and usable in affecting the play of the game program;

wherein said information identifying the game machine includes a random number value pre-programmed in the game machine by a manufacturer of the game machine.

6. A game machine comprising:

a display screen on which graphical components of a game program can be displayed in accordance with game program data, the game program data provided by a recording medium inserted into a receiving port on the game machine; and storage circuit having stored therein information corresponding to past usage of the game machine and usable in affecting the play of the game program;

wherein the information corresponding to past usage of the game machine stored in the storage circuit is based on the number of different types of games that have been played on the game machine.

7. A game machine comprising:

display screen on which graphical components of a game program can be displayed in accordance with a game program; and storage circuit having stored therein information unique to the game machine and usable in affecting the play of the game program;

wherein said information unique to the game machine is a production identifier specifying the particular game machine.

8. A game machine comprising:

a display screen on which graphical components of a game program can be displayed in accordance with a game program; and storage circuit having stored therein information unique to the game machine and usable in affecting the play of the game program;

wherein said information unique to the game machine includes a random number value pre-programmed in the game machine by a manufacturer of the game machine.

9. A game machine comprising:

a display screen on which graphical components of a game program can be displayed in accordance with a game program; and storage circuit having stored therein information identifying the game machine and usable in affecting the play of the game program;

wherein said information identifying the game machine is a production identifier specifying the particular game machine.

10. A game machine comprising:

a display screen on which graphical components of a game program can be displayed in accordance with a game program; and storage circuit having stored therein information identifying the game machine and usable in affecting the play of the game program, wherein said information identifying the game machine includes a random number value pre-programmed in the game machine by a manufacturer of the game machine.

11. A game machine capable of playing a game program in which some game programming data is provided on a removable storage medium, the game machine comprising:

a removable storage medium receiving port; and a second storage medium having stored therein information corresponding to the game machine and said information usable in affecting the play of the game program;

wherein said information corresponding to the game machine includes an identifier pre-programmed in the game machine by a manufacturer of the game machine.

* * * * *